US012637618B2

(12) United States Patent
    Forman et al.

(10) Patent No.:    US 12,637,618 B2
(45) Date of Patent:         May 26, 2026

(54) METHOD OF MANUFACTURE OF A RESIN

(71) Applicant: Massachusetts Institute of Technology, Cambridge, MA (US)

(72) Inventors: Jack Forman, Cambridge, MA (US); Ozgun Kilic Afsar, Cambridge, MA (US); Hsin-Ju Lin, Cambridge, MA (US); Cedric Honnet, Cambridge, MA (US); Neil Gershenfeld, Cambridge, MA (US); Hiroshi Ishii, Cambridge, MA (US)

(73) Assignee: Massachusetts Institute of Technology, Cambridge, MA (US)

( * ) Notice:   Subject to any disclaimer, the term of this patent is extended or adjusted under 35 U.S.C. 154(b) by 0 days.

(21) Appl. No.: 18/927,122

(22) Filed:      Oct. 25, 2024

(65)           Prior Publication Data
      US 2025/0136869 A1      May 1, 2025

Related U.S. Application Data

(60) Provisional application No. 63/593,031, filed on Oct. 25, 2023.

(51) Int. Cl.
    *C09K 19/38*         (2006.01)
    *B01J 27/24*         (2006.01)
          (Continued)

(52) U.S. Cl.
    CPC ........... *C09K 19/3833* (2013.01); *B01J 27/24* (2013.01); *B29C 48/022* (2019.02); *B29C 48/05* (2019.02);
          (Continued)

(58) Field of Classification Search
    CPC .................................................... C09K 19/38
    See application file for complete search history.

(56)                 References Cited

U.S. PATENT DOCUMENTS

2011/0049768 A1*   3/2011   Hu ........................... D01F 11/04
                                                                  526/320
2019/0077071 A1*   3/2019   Ware .................... C09D 11/101
2021/0268244 A1    9/2021   Niichel et al.

FOREIGN PATENT DOCUMENTS

WO          2023133947 A1      7/2023

OTHER PUBLICATIONS

Forman et al. , "Fabricating 4D Fiber Interfaces by Continuous Drawing of Temperature Tunable Liquid Crystal Elastomers". No. 19, Oct. 29, 2023. pp. 1-17. 210.1145/3586183.3606732 (Year: 2023).*

(Continued)

*Primary Examiner* — Chanceity N Robinson
(74) *Attorney, Agent, or Firm* — Dunlap Bennett & Ludwig PLLC

(57)                 ABSTRACT

Liquid Crystal Elastomer (LCE) fibers, an apparatus for manufacturing, and a method for using the apparatus are provided. LCE fibers formed from each of a plurality of resin recipes can undergo reversible temperature driven actuation of the fiber. Each of the resin recipes forms a fiber having a different actuation temperature. The apparatus includes: an extrusion device, a drawing bobbin, a coating basin, a collector bobbin, a first plurality of curing devices, and a second plurality of curing devices, to transform a resin recipe into a LCE fiber. In operation, the extrusion device extrudes the resin through to the first plurality of curing devices for a partial cure. Once in contact with drawing bobbin the resin is coated in a fluid, and then pull through the second plurality of curing devices for a final cure by collector bobbin, where it can be collected and post-processed.

12 Claims, 8 Drawing Sheets

(51) Int. Cl.

| | |
|---|---|
| *B29C 35/08* | (2006.01) |
| *B29C 48/00* | (2019.01) |
| *B29C 48/05* | (2019.01) |
| *B29L 31/48* | (2006.01) |
| *C08F 136/02* | (2006.01) |

(52) U.S. Cl.
CPC .... *C08F 136/02* (2013.01); *B29C 2035/0827* (2013.01); *B29L 2031/48* (2013.01); *C09K 2219/01* (2013.01)

(56) References Cited

OTHER PUBLICATIONS

Forman, J., Afsar, O. K., Nicita, S., Lin, R. H., Yang, L., Hofmann, M., Kothakonda, A., Gordon, Z., Honnet, C., Dorsey, K., Gershenfeld, N., & Ishii, H. (2023). FibeRobo: Fabricating 4D Fiber Interfaces by Continuous Drawing of Temperature Tunable Liquid Crystal Elastomers. UIST '23, 1-17. https://doi.org/10.1145/3586183.3606732.
International Search Report and Written Opinion; PCT/US2024/053035; Mailed Mar. 10, 2025.

* cited by examiner

METHOD OF MANUFACTURE OF A RESIN

CROSS-REFERENCE TO RELATED APPLICATIONS

This application claims the benefit of priority of U.S. provisional application No. 63/593,031, filed Oct. 25, 2023, the entire contents of which are herein incorporated by reference.

BACKGROUND OF THE INVENTION

Field of Invention

The present disclosure relates to textiles and methods of manufacture, and more particularly, to a liquid crystal elastomer textile configured to respond to thermal stimuli, an apparatus for manufacturing said textile, and a method of manufacturing said textile.

Background of Related Art

Actuatable fibers and fabrics have come into focus as a means for providing interactive surfaces, or interfaces, for Human centered computing applications, such as Human Computer Interactions (HCI). These interfaces utilize properties of textiles, such as softness and flexibility, in combination with properties of actuators, such as movement, or morphing in response to stimuli, to provide programmable interfaces for HCI.

Traditionally, three approaches have been utilized in the creation of actuatable fibers and/or fabrics: embedding hardware into a textile, or fabric; engineering interactive properties, such as actuation and sensing, directly into the textile or fabric; and creating textiles utilizing morphing fibers. However, each of these approaches suffer from one or more deficiencies related to diminished affordances of the textile, complexities associated with design and implementation, unintuitive manipulation of the textile, and/or the need for new processes and/or machines that are significantly different from standard approaches utilized to knit and weave textiles.

Embedding hardware, such as rigid buttons, slider knobs, Light Emitting Diodes (LED), and/or microcontrollers, into a textile result in diminishment of the affordances, such as softness and flexibility, of the textile as the hardware itself is rigid and/or intrusive to a user. Additionally, embedded hardware typically requires additional complex design tools for implementation and/or programming adding layers of cost and time associated with knowledge required for implementation. Finally, new manufacturing techniques are typically required for this technique, as rigid structures are not typically utilized in traditional textile manufacturing techniques, such as weaving, knitting, and sewing, thereby increasing costs associated with new equipment and manufacturing know-how.

Engineering active properties, such as actuation and sensing properties, directly into a textile requires unintuitive manipulation of the textile and typically requires new manufacturing techniques thereby increasing costs associated with new equipment and manufacturing know-how.

Utilization of morphing fibers in fabrics has resulted in programmable interfaces that can be manufactured utilizing traditional textile techniques. However, prior art approaches to this technique show deficiencies in one or more of: actuation magnitude, actuation speed, hysteresis, and/or self-reversibility. Currently, when selecting a fiber to be utilized in a programmable interface a designer must accept a tradeoff between one or more of actuation magnitude, actuation speed, hysteresis, and/or self-reversibility.

For example, a pneumatic artificial muscle fiber compatible with traditional machine knitting, weaving, and hand sewing was introduced in OmniFiber: Integrated Fluidic Fiber Actuators for Weaving Movement-based Interactions into the 'Fabric of Everyday Life.' The pneumatic artificial muscle fiber exhibited large actuation magnitudes (~32% of its total length), fast actuation speeds (less than 1 second), low hysteresis, and the ability to self-reverse, but requires a bulky and noisy pneumatic pump for actuation. Thermally actuated Shape Memory Alloy micro-springs compatible with traditional hand sewing and threading were introduced in KnitDermis: Fabricating Tactile On-Body Interfaces Through Machine Knitting. The SMA micro-springs exhibited larger actuation magnitudes than those of OmniFiber (~50% of their total length), and fast actuations speeds (less than 1 second), but require manual intervention to reset, thereby lacking self-reversibility, and having high hysteresis, wearing out after only a few actuations. Thermally actuated Twisted-then-Coiled Polymers (TCP) compatible with hand sewing and weaving were introduced in ModiFiber: Two-Way Morphing Soft Thread Actuators for Tangible Interaction. The TCP muscles exhibited low hysteresis and self-reversing capabilities but exhibited very small actuation magnitudes (~5% of their total length) and slow actuation speed (~5 minutes). None of the prior art morphing fibers can effectuate an acceptable balance of large actuation magnitudes, fast actuation speeds, low hysteresis, and self-reversibility.

As can be seen there is a need for a skin safe morphing fiber that is self-reversing, hysteresis-free, having large actuation magnitudes, having fast actuation speeds (on the order of seconds and not minutes), and is compatible with traditional textile manufacturing processes.

BRIEF SUMMARY OF THE INVENTION

In one aspect of the present disclosure, two methods for synthesizing resins for use in creation of thermally actuated Liquid Crystal Elastomer (LCE) fibers. In the present disclosure, each of the two methods produces a different resin which can be transformed into an LCE fiber having unique thermal-actuation characteristics. In the present disclosure, the first method can be utilized to synthesize a resin for making LCE fibers with actuation temperatures well above safe skin temperatures. In the present disclosure, the second method can be used to synthesize a resin for making LCE fibers with actuation temperatures at skin temperatures.

In another aspect of the present disclosure, an apparatus for synthesizing LCE fibers is provided. In the present disclosure, the apparatus can include a plurality of manufacturing components housed within a frame, and protected by a plurality of safety shields affixed to the frame forming an enclosure around the plurality of manufacturing devices. In the present disclosure, the plurality of components can include an extrusion device configured to heat and extrude a resin provided to the apparatus; a drawing bobbin configured to draw the extruded resin from the extrusion device and submerge the extruded resin in a fluid contained in a container basin; a collector bobbin configured to collect manufactured LCE fibers; and a first and second plurality of curing devices configured to provide curing to the resin at differing locations in the device. In the present disclosure, the first plurality of curing devices are disposed between the extrusion device and the drawing bobbin such that as drawing bobbin draws resin, the resin is pulled through the first plurality of curing devices to obtain an initial, or partial cure. In the present disclosure, the second plurality of curing devices are disposed between the drawing bobbin and the collector bobbin, such that as collector bobbin pulls, partially cured and coated resin is finally cured forming LCE fiber which is deposited on the collector bobbin.

In yet another aspect of the present invention, at least one controller is provided with the apparatus and is configured to control the manufacturing of LCE fiber. In the present disclosure, the at least one controller can monitor one or more parameters of the plurality of manufacturing devices, and can set, adjust, or otherwise modify the one or more parameters.

In a final aspect of the present invention, a method of making LCE fiber utilizing the apparatus of the present disclosure is provided. In the present disclosure, a syringe containing a resin made utilizing one or the two methods disclosed can be provided to the extruding device. In the present disclosure, a setup phase of the apparatus can be provided where a first length of resin is extruded and connected to/or passed through each of the plurality of manufacturing components. Once the setup phase is completed, LCE fiber creation commences wherein the at least one controller causes resin to continuously extruded such that it is partially cured, bathed in a fluid while in contact with the drawing bobbin, finally cured, and collected on the collector bobbin. In the present disclosure, the method can be repeated utilizing any number of syringes having either resin formula.

DETAILED DESCRIPTION OF THE INVENTION

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

Liquid Crystal Elastomers (LCE), are solid elastic materials incorporating liquid crystal molecules that undergo temperature driven actuation, shrinking at a first temperature and expanding at a second temperature, have emerged as a leading candidate for use in textiles. LCEs are an attractive alternative to other morphing fibers, such as SMAs, because they do not require extensive training for two-way actuation, are hysteresis-free, and have large actuation magnitude capabilities without coiling. Despite their promise, barriers to LCE utilization remain due to fusion in the manufacturing process, making creation of large spools of LCEs impossible, and the lack of an LCE with skin safe actuation temperatures.

Broadly, an embodiment of the present disclosure provides thermally actuated LCE fibers that can be embedded or structured into textiles and provides an apparatus and process for manufacturing the LCE fibers. The LCE fibers exhibit three distinct properties that set it apart from other morphing fibers, or artificial muscles, explored in HCI. First, LCE fibers are capable of rapid thermal self-reversing actuation with large displacements (~40%). Second, the process of manufacturing the LCE fibers allows the production of hundreds of meters of fiber with a sub-millimeter diameter. Third, LCE fiber and process for manufacturing is fully compatible with existing textile manufacturing machinery such as weaving looms, embroidery machines, and knitting machines. Due to mechanical characteristics, the LCE fibers demonstrate the ability to establish higher hierarchical textile structures. The LCE fibers can be utilized in a set of applications that illustrate the wide design space, for example, a bra with dynamic support, a blooming lamp, and a canine compression garment. By providing a robust and manufacturing-minded actuating fiber system, the LCE fibers deliver the potential to enable transformative textile tinkering for any user with a sewing needle.

Figure 1:
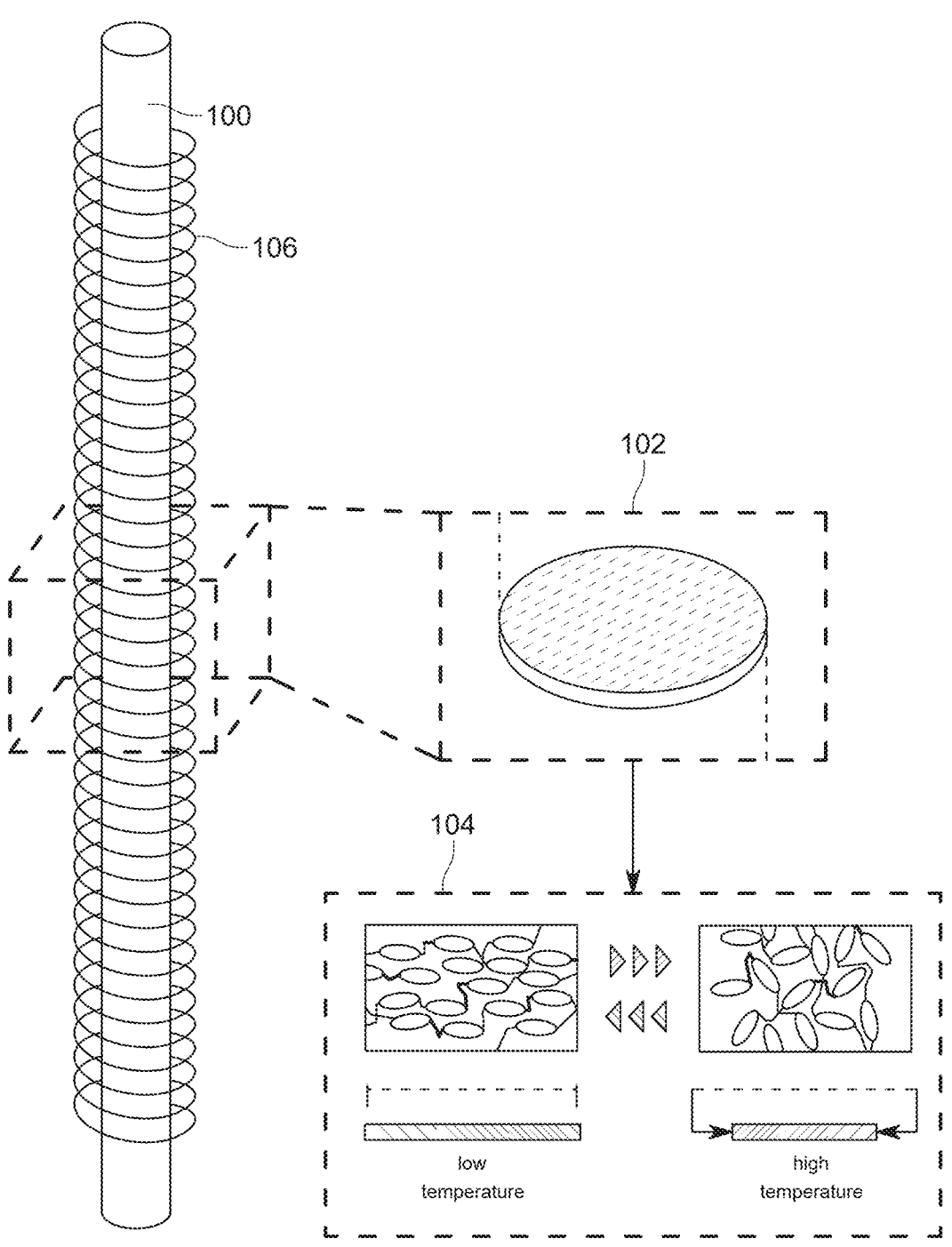
FIG. 1 is a diagram of an overview of an embodiment of LCE fibers, according to aspects of the present invention.

FIG. 1 illustrates an overview of embodiments of actuatable LCE fibers. In embodiments, LCE fiber 100 can be synthesized from one of a plurality of resin recipes, and can be manufactured utilizing a novel apparatus and manufacturing process. Cross-sectional view 102 illustrates an overview of the structure of the liquid crystal elastomer molecules in LCE fiber 100, while an exploded view 104 illustrates the working principle of the liquid crystal molecules that undergo a reversible temperature driven phase change from an ordered (isotropic) phase to a disordered (anisotropic) phase. In embodiments, each of the plurality of recipes result in a differing actuation temperature for LCE fiber 100, such as a low-temperature (47° C.) resin and a high-temperature (60° C.) resin. In embodiments, the result of the manufacturing process is LCE fiber 100 having morphing capabilities. Additionally, post-processing of LCE fiber 100 can include optional components such as a heating element, and/or one or more coatings configured to alter at least one attribute of LCE fiber 100.

Figure 2:
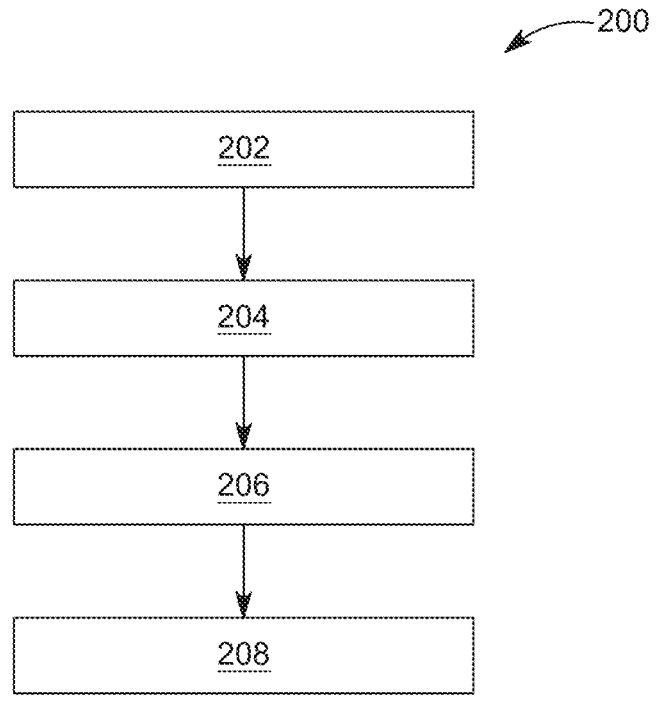
FIG. 2 is a flow diagram of a method of synthesizing a resin used for manufacturing LCE fibers with high actuation temperatures.

FIG. 2 is a flow diagram of a method 200 for synthesizing a resin used for manufacturing high actuation temperature LCE fibers. At step 202, 15 grams of a mesogen, such as, 1,4-Bis-[4-(6-acryloyloxyhexyloxy)benzoyloxy]-2methyl-benzene (RM82) and 0.105 grams of Butylated Hydroxytoluene (BHT) can be added to a container and can be placed in an oven set at 110° C. until the mixture is completely melted. Advantageously, utilization of BHT as a reaction inhibitor, prolongs the shelf life of the resulting high actuation temperature resin.

At step 204, 4.5 milliliters of a joining molecule, such as 2,2-(ethylenedioxy)diethanethiol (EDDET) and 800 microliters of a vinyl cross-linker, such as 1,3,5-triallyl-1,3,5-triazine-2,4,6(1H,3H,5H)trione (TATATO) are added to the melted mixture in the container, and mixed thoroughly. In embodiments, TATATO may come as a solid compound and, is optionally, meltable in a lukewarm water bath for measurement via pipette. Once mixed the container is returned to the oven and baked at 110° C. until completely clear, or transparent.

At step 206, 0.42 grams of a photoinitiator, such as 2,2-dimethoxy-2-phenylacetophenone (I-651) and 100 microliters of a chemical initiator, such as Dipropylamine (DPA), are added to the container and mixed vigorously. In embodiments, chemical initiator, such as DPA, can catalyze a reaction such that mesogens are linked into long chains, resulting in a viscous resin that can be extruded and drawn during a manufacturing process. Additionally, photo initiator, such as I-651, catalyzes a second reaction wherein the vinyl cross-linker, such as TATATO, binds the long chains together, thereby solidifying the resulting fiber.

At step 208, the mixture is centrifuged at approximately 3,000 revolutions per minute (RPM) for approximately 3 minutes, to remove air bubbles. Once centrifuged, the resulting resin can be stored in a container, such as a syringe, until needed. In embodiments, storage should take place in a cool and dark location. Additionally, if more than one day has passed since formulation, the resulting resin should be heated to 80° C. prior to usage, to reset the material.

The specific measurements named herein, for method 200, are for low-scale production, but easily scale up for any amount of production desired. Proportions of the chemical ingredients are as depicted in Tables I (below). It will be appreciated that handling and deployment of the resin will require its own scale-up, for example by processing batches into multiple (instead of single) syringes.

TABLE 1

| Compound | Generalized Proportion |
| --- | --- |
| RM82 | 60-80 wt % |
| BHT | .4-1 wt % |
| EDDET | 15-30 wt % |
| TATATO | 3-8 wt % |
| I-651 | 1-2 wt % |
| DPA | .2-.5 wt % |

Figure 3:
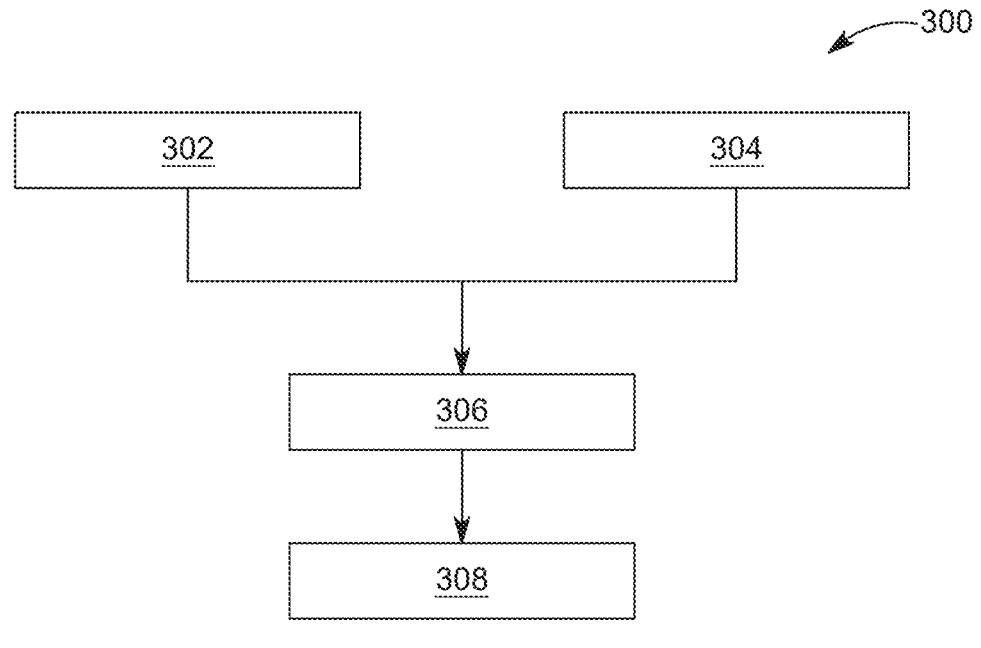
FIG. 3 is a flow diagram of a method of synthesizing a resin used for manufacturing LCE fibers with low actuation temperatures.

FIG. 3 is a flow diagram of a method 300 for synthesizing a resin used for manufacturing low actuation temperature LCE fibers. At step 302, 15 grams of a mesogen, such as RM82, is added to a first container along with a 5 grams of a reactive mesogen, such as Bis-[4-(3-acryloyloxypropyloxy)benzoyloxy]-2methylbenzene (RM-257) and 0.62 grams of BHT, and are melted at 80° C. In embodiments, addition of RM-257 lowers the actuation temperature of the fiber resulting from the resin.

At step 304, 7.5 milliliters of a joining molecule, such as glycol di(3-mercaptopropionate) (GDMP) is preheated in a second container to 80° C. In this embodiments, GDMP is utilized in place of EDDET as the joining molecule to aid in production of fibers that actuate at lower temperatures. In embodiments, steps 302 and 304 occur concurrently, or at the same time.

At step 306, the contents of the first container and the second container are mixed, an in rapid succession, 0.47 grams of a photoinitiator, such as I-651, and 1.7 milliliters of a vinyl cross-linker, such as TATATO, are added to the mixture and subsequently mixed vigorously.

At step 308, 0.47 milliliters of Triethylamine (TEA) is added to the mixture, which is then placed into a container, such as a syringe, for degassing in the centrifuge and eventual storage. In embodiments, degassing occurs by placing the syringe filled mixture into a centrifuge at approximately 3,000 revolutions per minute (RPM) for approximately 3 minutes.

The specific measurements named herein, for method 300, are for low-scale production, but easily scale up for any amount of production desired. Proportions of the chemical ingredients are as depicted in Tables I (below). It will be appreciated that handling and deployment of the resin will require its own scale-up, for example by processing batches into multiple (instead of single) syringes.

TABLE 2

| Compound | Generalized Proportion |
| --- | --- |
| RM82 | 46 wt % |
| RM257 | 15 wt % |
| BHT | 2 wt % |
| GDMP | 28 wt % |
| I-651 | 1.4 wt % |
| TATATO | 6 wt % |
| TEA | 1 wt % |

Figure 4:
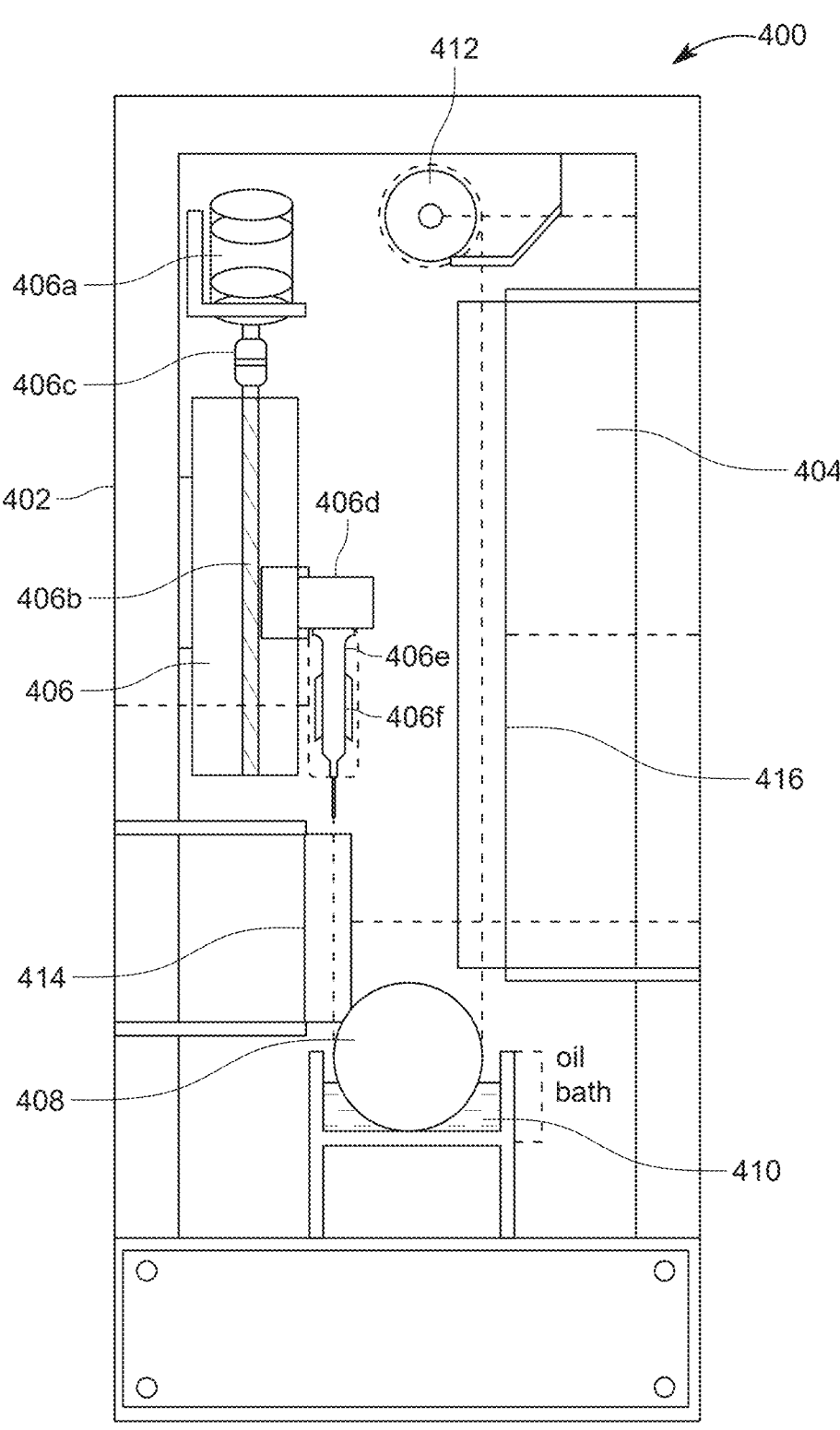
FIG. 4 is a diagram of an embodiment of LCE fiber manufacturing apparatus, according to aspects of the present invention.
Figure 5:
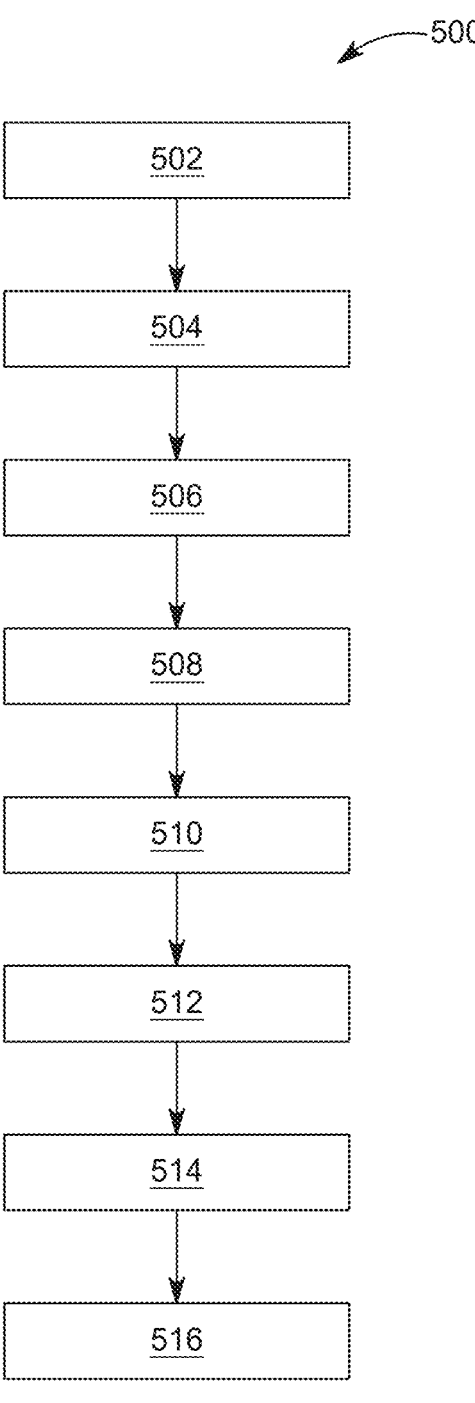
FIG. 5 is a flow diagram of an embodiment of a method of synthesizing LCE fibers utilizing the apparatus of FIG. 4, according to aspects of the present invention.

FIG. 4 is a diagram of an embodiment of an LCE fiber manufacturing apparatus 400, according to aspects of the present invention. A housing 402 of apparatus 400 can be formed of a plurality of interconnected structures forming a frame configured to house a plurality of manufacturing components. In embodiments, the plurality of interconnected structures can be commodity materials, and/or metals, such as aluminum, steel, etc., and more specifically can be square T-slot Aluminum extrusions, such as 2020 Aluminum extrusions. In embodiments, a plurality of safety shields 404 are affixed to housing 402 thereby enclosing the plurality of manufacturing components therein. In embodiments, at least one of the plurality of safety shields 404 can be hingeably attached to a portion of the frame, and removably attached to another portion of the frame thereby forming a hinging door. In embodiments, plurality of safety shields 404 can be formed from rigid transparent materials, such as acrylic, and can have a film adhesively disposed thereon to block UV light transmission. In embodiments, the film can be pretreated, as known in the art, to block UV light and specifically chosen for its UV blocking characteristics. In a specific embodiment, the film can be building/residential tint film treated to block 99% of UV-A and UV-B rays. Advantageously, housing 402 having plurality of safety shields 404 at least partially affixed thereto can provide a barrier between users and UV light, and the plurality of manufacturing components, thereby protecting both the users and the components from damage.

The plurality of manufacturing components of apparatus 400 can include, but are not limited to, an extrusion device 406, a drawing bobbin 408, a coating basin 410, a collector bobbin 412, a first plurality of curing devices 414, and a second plurality of curing devices 416. Additionally, at least one controller, such as a computer, computing device, microcontroller, etc., can be provided and configured to control the plurality of manufacturing components. In embodiments, the plurality of manufacturing devices can be installed within, affixed to, or otherwise be operatively connected with housing 402 utilizing specifically manufactured components, or commodity components, and utilizing techniques known in the art.

Extrusion device 406 can be a syringe pump configured to extrude high-viscosity fluids, i.e. resin mixture. In embodiments, extrusion device 406, as a syringe pump can include a motor 406a, a lead screw 406b, a coupler 406c, a plunger 406d, a removably affixed syringe 406e, and a heating element 406f. In embodiments, motor 406a can be a stepper motor and can be configured to provide rotational motion to actuate one or more components of extrusion device 406. In embodiments, motor 406a can be coupled to lead screw 406b via coupler 406c, such as through a drive shaft of motor 406a, such that rotational motion provided by motor 406a can be transferred into linear motion, i.e. linear actuation. Lead screw 406b can be coupled, additionally, to plunger 406d, such that rotational motion provided by motor 406a and converted to linear motion by lead screw 406b can cause plunger 406d to actuate bi-directionally, as needed, to compress/decompress removably affixed syringe 406e thereby causing extrusion of resin material, or reset of syringe 406c.

Additionally, motor 406a can be provided with a gear reducer with gearing configured to reduce the rotational speed of motor 406a and/or increase its torque. In embodiments, at least one controller, such as a computer, computing device, microcontroller, etc., can be provided to control at least one parameter of motor 406a, such as rotational speed, rotation direction, torque, etc. Additionally, one or more additional control components, such as a motor driver, hardware, circuitry, or a combination of hardware and software can be provided to assist the at least one controller in operation.

Heating element 406f can be removably affixed to syringe 406e and can be configured to output a present, or desired temperature. In embodiments, the at least one controller, or an additional controller, can be configured to control heating element 406f to maintain a desired temperature. In embodiments, to control heating element 406f, the at least one controller, or an additional controller, can be provided temperature measurements, at intervals, from one or more temperature sensors such as K-type thermocouples, or other thermocouples known in the art. In embodiments, a thermocouple module configured to perform analog-to-digital conversion of measurements from the one or more temperature sensors can be provided and communicatively coupled between the one or more temperature sensors and the at least one controller, or additional controller.

Drawing bobbin 408 can be a bobbin, or spool, operatively connected to a bobbin motor configure to provide rotational motion to move bobbin 408. In embodiments, the at least one controller can be provided to control at least one parameter of the bobbin motor, such as rotational speed, rotational direction, etc. Additionally, in operation bobbin motor can rotate drawing bobbin 408 at a set constant speed, which can be changed in real-time, such that extruded resin can be drawn while in contact with drawing bobbin 408.

Coating basin 410 can be a receptacle, container, or basin, disposed below, and proximate to drawing bobbin 408. Coating basin 410 can be configured to store a fluid, such as mineral oil, such that a portion of drawing bobbin 408 is submerged therein. In operation, drawing bobbin 408 rotates extruded resin in contact therewith can be submerged, or bathed, in mineral oil disposed within Coating basin 410. Advantageously, this coating remedies issues associated with fusing seen in prior art apparatuses, thereby allowing larger continuous runs of fiber manufacturing.

Collector bobbin 412 can be a bobbin, or spool, operatively connected to a collector motor configured to provide rotational motion configured to move Collector bobbin 412. In embodiments, the at least one controller can be provided to control at least one parameter of the collector motor, such as uptake speed, rotational direction, etc. Additionally, in operation collector motor can rotate collector bobbin 412 at a set constant speed, which can be changed in real-time, such that extruded resin mixture, once finally cured, as LCE fiber can be collected thereon. Additionally, the at least one controller can coordinate, i.e. control and/or adjust as needed in real-time, a drawing speed of drawing bobbin 410 and an uptake speed of collector bobbin 412, as the difference in these two speeds controls the stretching of extruded resin and thus the resulting fiber thickness.

A first plurality of curing devices 414 and a second plurality of curing devices 416 are disposed of within apparatus 400 and are configured to cure extruded resin mixture. In embodiments, each of the plurality of curing devices 414 and 416 can be affixed to a plurality of movable structural support, in a specific embodiment a plurality can be two movable structural supports disposed opposite one another, and can form as a channel, such that extruded resin mixture can pass through an interior portion thereof. In embodiments, each of the plurality of curing devices 414 and 416 can be a plurality of Ultra-Violet (UV) light strips disposed on each interior wall of each of the plurality of movable structural supports, i.e. a wall facing the extruded resin, such that the extruded resin mixture can be exposed to UV light from at least two differing sides. In embodiments, the plurality of UV light strips can be Light Emitting Diode (LED) strips. In a specific embodiment, the plurality of UV light strips can have a wavelength of 365 nanometers. Advantageously, the configuration of each of curing devices 414 and 416 provides two double sided cures for the extruded resin mixture which eliminates coiling seen in prior art methods. Coiling has been a key factor in rendering prior art fibers incompatible with common textile manufacturing techniques.

First plurality of curing devices 414 can be disposed between the extruding device 402 and the drawing device 404, and second plurality of curing devices 416 can be disposed between the drawing device 404 and the collection device 408, such that curing can occur at two separate locations in the manufacturing process. In embodiments, each of the plurality of curing devices 414 and 416 can be controlled by the at least one controller, which can be configured to vary at least one parameter of the UV light strips, such as brightness, intensity, etc. In embodiments, the at least one controller can include a Pulse Width Modulation (PWM) dimmer configured to adjust the brightness of the UV light strips of either, or both of curing devices 414 and 416. Advantageously, the plurality of curing devices 414 and 416 increase UV exposure during the manufacturing process thereby reducing the tendency of the resin mixture to fuse during manufacturing.

Referring now to a method 500 of manufacturing LCE Fiber utilizing apparatus 400. As an initial matter, prior to fiber manufacturing beginning in earnest a setup phase must commence. At step 502, the setup phase commences and removable affixed syringe 406c becomes seated, or otherwise disposed within, extrusion device 406 and pre-heated, utilizing heating element 406f to a pre-set temperature. In embodiments, heating element 406f, utilizing the at least one controller, can maintain the resin mixture at the pre-set temperature for the duration of manufacturing. In a specific embodiment, the pre-set temperature is approximately 34° C., which advantageously lowers the viscosity of the resin mixture and facilitates extrusion thereof.

At step 504, setup phase continues when plunger 406d is actuated to cause a first length of resin mixture to extrude from an opening of syringe 402e. The first length of extruded resin mixture is passed through the channel of first plurality of curing devices 414 where it is exposed to UV light, thereby causing a partial cure of the extruded resin mixture.

is continuous such that the first length is continuous with the at least one additional length, and each subsequent length is in continuity.

At step 516, an optional post-processing phase can begin. Method 500 results in the creation of a thermally actuatable LCE fiber, whose actuation temperature depends on the resin recipe utilized, usable in textile manufacturing such as clothing. Table 3 illustrates the properties of LCE fibers made by each resin recipe. The LCE fiber can be modified through one or more post-processing mechanisms to add sensing and/or resistive heating capabilities to the LCE fiber.

TABLE 3

| | Total Stroke | Actuation Start Temperature (° C.) | Actuation Stop Temperature (° C.) | Actuation speed (seconds) | Hysteresis | Self-reversing |
|---|---|---|---|---|---|---|
| LCE Fiber (method 200) | 38% | 40 ± 5 | 80 ± 5 | ~8 | Low | Yes |
| LCE fiber (method 300) | 33% | 30 ± 5 | 60 ± 5 | ~8 | Low | Yes |

At step 506, once partially cured, the first length of extruded resin mixture can be stretched around drawing bobbin 408, passed through the second of the plurality of curing devices 416, and placed onto collector bobbin 408. In embodiments, partially cured resin mixture can be manually stretch and/or maneuvered, as described above, by utilizing tweezers, which completes the setup phase.

At step 508, a drawing phase begins, after a setup phase, wherein at least one additional length of resin mixture is extruded from an opening of syringe 406e, by actuation plunger 406d using motor 406a, and incurring a partial curing by passing through the channel of first plurality of curing devices 414, thereby exposing the at least one additional length of resin to UV lighting.

At step 510, once through the channel of first plurality of curing devices 414, the at least one additional length of resin mixture contacts drawing bobbin 408, operating at a set speed, causing stretching and alignment of the at least one additional length of resin. Additionally, the at least one additional length of resin is submerged in a fluid, such as mineral oil, while traveling on drawing bobbin 408, thereby coating the at least one additional length of resin.

At step 512, once coated the at least one additional length of resin is pulled through a final curing process by collector bobbin 412, operating at a set speed. In embodiments, the at least one additional length of resin is pulled through the channel of the second of the plurality of curing devices 416, thereby exposing the at least one additional length of resin to additional UV lighting an creating LCE fiber.

At step 514, LCE fiber is pulled onto collector bobbin 412, operating at a set speed. Once all LCE fiber has been manufactured and is disposed on collector bobbin 408 it can be unspooled from collector bobbin 408 and coated with a friction inhibitor. In embodiments, LCE fiber can be coated, or dusted, with talc powder to facilitate low-friction movement through carrier and tensioning mechanisms of various textile processes such as embroidery and knitting. Advantageously, once manufactured into a fabric, friction inhibitor can be removed with warm soapy water. It is understood that the steps outlined above refer to a first length and at least one additional length of resin, for ease of explanation. The resin In embodiments, braiding techniques known in the art, such as Maypole braiding, can be utilized to integrate one or more threads having the required functionality into the LCE fiber. For example, a heating element, such as a Litz wire, can be wrapped around the LCE fiber to provide resistive heating to actuate LCE fiber that require high temperature actuation, i.e. temperatures above safe body temperature ranges. In a specific embodiment, a voltage of 8.5V and current of 2.5 A can be applied to the resistive heating element which can surround LCE Fiber created utilizing method 200, causing ~37% contraction in 8 seconds and reversion to original length in 30 seconds. In the specified embodiment, the normalized power per unit length is $4.71 \times 10^{-2}$ Watts/millimeter.

An additional post-processing technique can include coating the LCE fiber with a conductive coating configured to enable capacitive and stretch sensing. In embodiments, the LCE fiber can be soaked in a conductive coating solution comprising Carbon Black and Toluene for 6 hours and then dried in an oven set at 80° C. for 1 hour. In a specific embodiment, the conductive coating solution is 7% by weight of Carbon Black and 93% by weight of Toluene.

An Additionally post-processing technique can include combining the LCE fiber with one or more additional fabrics, or threads, such as a conductive thread, and/or a non-conductive thread. In embodiments, conductive threads can be added to the LCE fiber by wrapping, and/or braiding, or otherwise integrating, the conductive thread. In embodiments, conductive threads can be configured for electrical routing to serve as an input sensor, i.e. capacitive load sensor, or resistive bend/stretch sensor, and as a heating element for actuation of the LCE fiber. In embodiments, the conductive thread can be a litz wire, such as a silk-coated litz wire, or a silver-plated nylon thread. In embodiments, a non-conductive thread can be integrated with the LCE fiber and conductive thread for insulation. In embodiments, the non-conductive thread can be cotton, silk, or other non-conductive materials.

Figure 6:
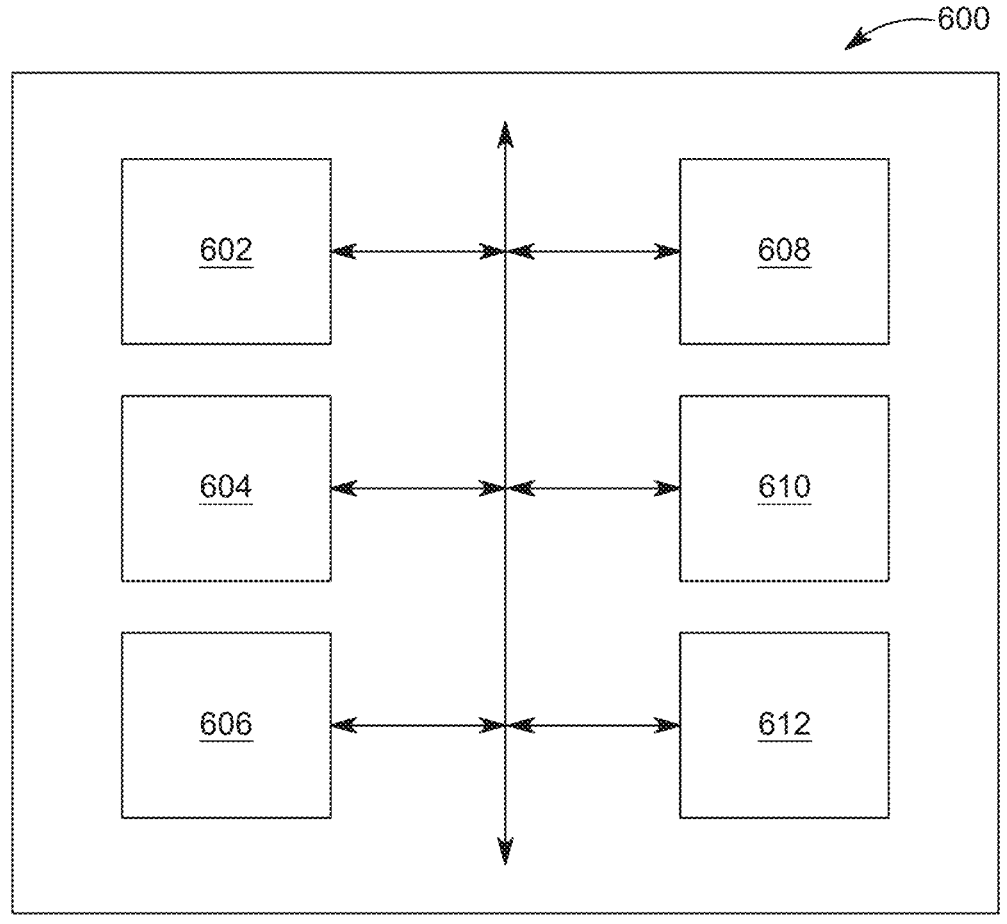
FIG. 6 is a block diagram of an embodiment of a controller for controlling LCE fiber manufacturing apparatus, according to aspects of the present invention.

FIG. 6 illustrates an embodiment of the at least one controller 600. In embodiments, the controller can have a processing unit 602, such as a CPU, GPU, or other known processing units in the art, and at least one memory 604 configured to store instructions that when executed control one or more of the manufacturing components of apparatus 400. In embodiments, memory can include both volatile and non-volatile memories, such as RAM, ROM, hard-disk storage, and/or solid-state memory. A plurality of I/O ports 606 can be provided for communication with internal an external devices, utilizing communication protocols known in the art. One or more timers 608 can be provided to control execution by processing unit 602. One or more converters 610, such as analog-to-digital converters can be provided to interface with one or more components. Finally, one or more other interfaces 612 can be provided to interface, utilizing techniques, and protocols known in the art, with additional devices as known in the art. Communication can occur in controller utilizing one or more buses (depicted as two-way arrows), as known in the art.

Figure 7:
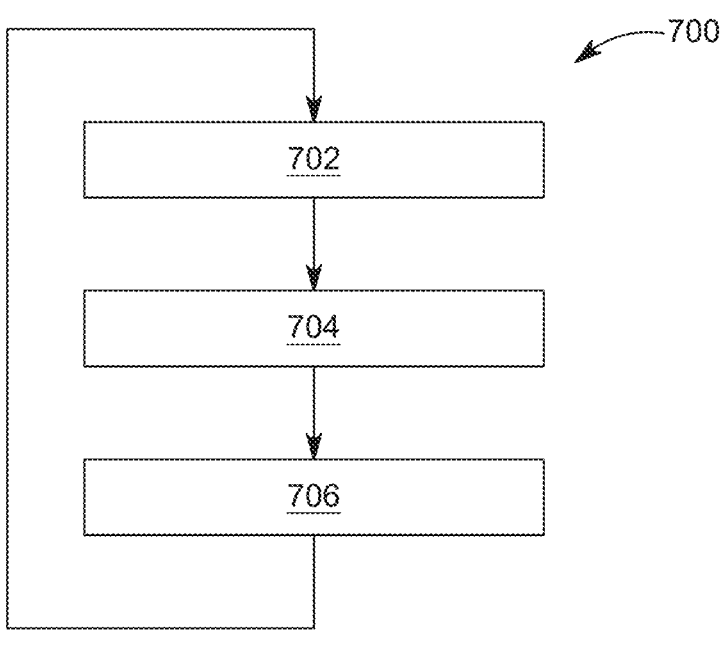
FIG. 7 is a flow diagram of an embodiment of a method of controlling, according to aspects the present invention.

FIG. 7 illustrates a method 700 of controlling apparatus 400 according to aspects of the present invention. In embodiments, method 700 can be implemented on controller 600. At step 702, a monitoring and adjustment phase begins, wherein each of the plunger 406d, drawing bobbin 408, collector bobbin 412, and the plurality of curing devices 414 and 416 operate, and at least partially monitored, and controlled by the at least one controller 600, in concert to produce LCE Fiber. In embodiments, the at least one controller 600 can be multi-threaded to concurrently monitor and adjust each of the plurality of manufacturing devices. Alternatively, the at least one controller 600 can include a plurality of controllers each monitoring and adjusting one or more of the plurality of manufacturing components. Additionally, it is understood that monitoring and adjustment occur continuously and in real-time during the operation of apparatus 400.

At step 704, a property of resin mixture, such as strength, brittleness, diameter, evenness, can be monitored, by a user, and at least one parameter of one of the plurality of manufacturing components can be modified. For example, UV light brightness affects the strength of the partially cured resin mixture, such that if the light is too dim the resin mixture will be brittle and separate during the manufacturing process. Alternatively, if the light is too bright the resin mixture will clump, forming uneven fibers, and may even clog the opening of syringe 402e. A user can observe the strength of the extruded resin for defects and utilizing the at least one controller and/or PWM dimmer can vary a parameter of curing device 414, such as brightness, dimness, intensity, etc., to address any issues. While it is explained with reference to a single point in time, it is understood that monitoring and adjustment of UV light brightness can occur continuously, in real-time, as resin is continuously extruded and collected as LCE fiber. It is understood that, the controller is explained with reference to a human-in-the-loop control system, however, it is envisioned that one or more sensors such as a camera, running suitable image processing software can replace the human-in-the-loop.

At step 706, one or more parameters of the one or more manufacturing components are monitored, controlled, and/or adjusted, by the at least one controller 600. In embodiments, the one or more parameters can include rotational speed or direction of motor 406a, temperature of resin mixture as reported by thermocouples, temperature of heating jacket 406f, rotational speed of bobbin motor of drawing bobbin 408, rotation speed of collector motor of collector bobbin 412, and/or a brightness or dimness of UV lights of curing device 416. In embodiments, the one or more parameters can control an attribute of the resulting LCE fiber, such as fiber diameter. Generally, the difference in speeds between drawing bobbin 408 and collector bobbin 412 controls the stretching of the resin mixture, and thus the fiber thickness. Additionally, resulting LCE fiber diameter decreases as speeds of drawing bobbin 408 and collector bobbin 412 increase. As such, a user can monitor an attribute of the resulting LCE fiber during manufacturing, and can adjust one or more of rotational speed or direction of motor 406a, i.e. effecting extrusion speed, rotational speed of bobbin motor of drawing bobbin 408, rotation speed of collector motor of collector bobbin 412, thereby changing the diameter of the resulting LCE fiber as desired, which can change the thermal response characteristics of the LCE fiber. It is understood that, the controller is explained with reference to a human-in-the-loop control system, however, it is envisioned that one or more sensors such as a camera, running suitable image processing software can replace the human-in-the-loop.

In embodiments, the one or more parameters can be utilized for real-time feedback control, such as to maintain a set temperature, set speed, set brightness, etc. For example, a user may require to set, or adjust a speed of one or more of drawing bobbin 408, collector bobbin 412, and/or motor 406a, one or more sensors can be provided to measure a current set speed of each or any of the devices, which can be fed back to controller 600 and used to adjust or set a speed to a user's requirement.

LCE fibers manufactured according to method 500 utilizing apparatus 400, and including at least resin mixture made in accordance with either of methods 200 or 300, exhibit clear advantages over the prior art related to attributes of the LCE fiber. Table 3 illustrates the characteristics of LCE fibers made utilizing the resin mixtures of methods 200 and 200.

Additionally, these LCE fibers exhibit a distinct advantage over the prior art with respect to compatibility with standard textile manufacturing machines, as it has been shown that the LCE fibers are compatible with Embroidery (both hand and machine), weaving, and machine knitting. Additionally, several actuatable textiles have been manufactured utilizing these LCE Fibers, such as an adaptive sports bra that compresses with body heat, a teletouch wearable for a dog, a self-actuating curtain that rises as heat is applied, and others.

Figure 8A:
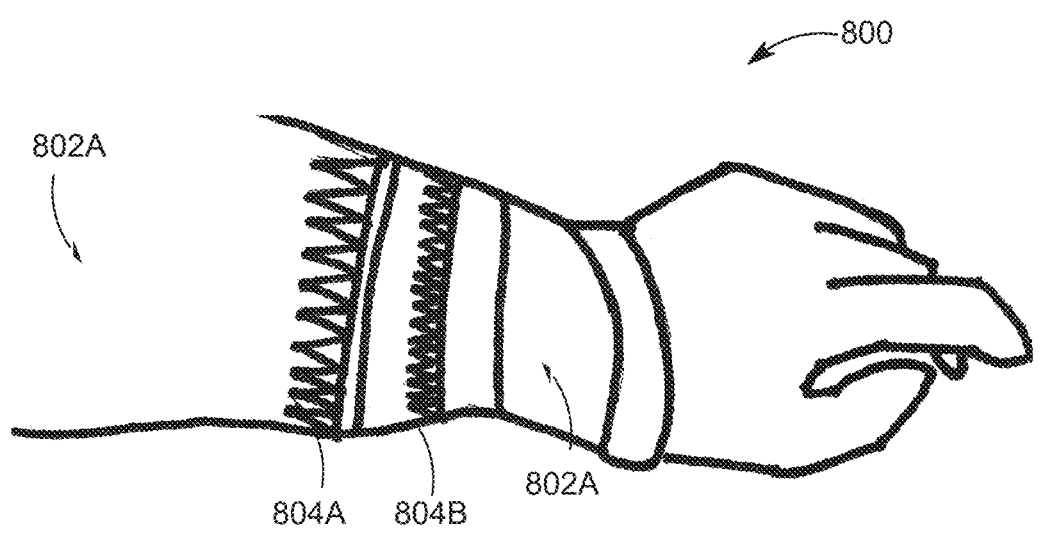
FIG. 8A is a schematic diagram of an embodiment of a clothing article having thermally actuated LCE fibers showing a default state, according to aspects of the present invention.
Figure 8B:
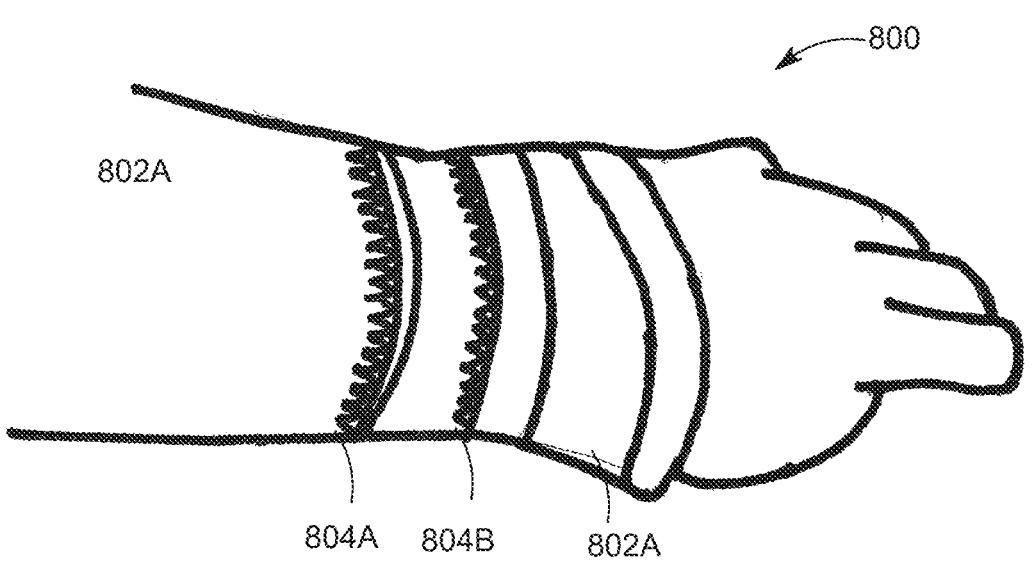
FIG. 8B is a schematic diagram of an embodiment of a clothing article having thermally actuated LCE fibers showing a contracted state, according to aspects of the present invention.

FIGS. 8A-B illustrates a textile 800, or article of clothing, manufactured utilizing LCE fibers of the present invention. In embodiments, textile 800 can be an article of clothing such as a shirt, bra, pants, vest, etc., which can include a plurality of commodity fibers 802A, such as yarn, cotton, silk, etc., interwoven, or otherwise affixed to a plurality of LCE fibers, such as plurality of LCE fibers 804A, and plurality of LCE fibers 804B. In embodiments, LCE fibers 804A and/or 804B can be LCE fibers made utilizing resin recipes of methods 200 and/or 300, and can have properties as outlined in Table 3, above. In embodiments, LCE fibers 804A and/or 804B are thermally actuate, as described above, such that at room temperature fibers 804A and/or 804B are in an expanded (as illustrated in FIG. 8A), or default state, and in response to a thermal stimuli, such as body heat, and/or heat applied by one or more heating elements, fibers 804A and/or 804B contract (as illustrated in FIG. 8B) causing article of clothing 800 to constrict, or otherwise contract.

Additionally, post-process of LCE fibers 804A and/or 804B, as described above with reference to method 500, can cause LCE fibers 804A and/or 804B to be electrically actuatable. For example, one or more of LCE fibers 804A and/or 804B can be post-processed to be combined with a conductive thread, and/or a non-conductive thread. In embodiments, a conductive thread can be a litz wire, or a silver-plated nylon thread, which can be wrapped around, or otherwise integrated with one or more of LCE fibers 804A and/or 804B. In embodiments, a power source can be provided to provide power to conductive thread, which can be configured to act as an input sensor, such as a capacitive load cell, and/or resistive bend/stretch sensor, and to provide heat through electrical resistance to actuate LCE fibers 804A and/or 804B. In embodiments, a non-conductive thread can be silk, cotton, or other non-conductive material, which can be configured to provide insulation. Advantageously, post-processing in this manner can create fabrics that can be knitted, woven, or embroidered to create a composite actuator that can sense input and actuate via resistive heat driven LCE actuation.

In embodiments, the type of resin utilized to make LCE fibers 804A and 804B effects the actuation temperature, where resin recipes 200 and 300 have actuation temperatures as laid out in Table 3 above. Additionally, post processing of LCE fibers 804A and/or 804B, such coating the fibers in a solution of Carbon black and Toluene, as described above, can cause the fibers to have a capacitive resistance, or piezoelectric attributes. For example, coating of LCE fibers 804A and/or 804B in the carbon black solution, described above, causes an approximately linear strain versus resistance relationships in the fiber. Performance characteristics, such as strain v. resistivity, advantages, manufacturing compatibilities, and actuatable textiles can all be seen in the following publication: Jack Forman, Ozgun Kilic Afsar, Sarah Nicita, Rosalie Hsin-Ju Lin, Liu Yang, Megan Hofmann, Akshay Kothakonda, Zachary Gordon, Cedric Honnet, Kristen Dorsey, Neil Gershenfeld, and Hiroshi Ishii, *FibeRobo: Fabricating* 4D *Fiber Interfaces by Continuous Drawing of Temperature Tunable Liquid Crystal Elastomers*. In Proceedings of the 36th Annual ACM Symposium on User Interface Software and Technology (UIST '23). Association for Computing Machinery, New York, NY, USA, 1-17, which is herein incorporated by reference in its entirety.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed:

1. A method of synthesizing a resin used for manufacturing high actuation temperature LCE fibers, the method comprising:

mixing, in a container, 60-80 wt % of a mesogen, and 0.4-1 wt % of a reaction inhibitor forming a first mixture;

baking, in an oven, the first mixture in the container until the first mixture is melted, an internal temperature of the oven being 110° C.;

mixing, into the container, 15-30 wt % of a joining molecule and 3-8 wt % of a vinyl cross-linker forming a second mixture;

baking, in the oven, the second mixture in the container until the second mixture is completely clear, or transparent, the internal temperature of the oven being 110° C.;

mixing, into the container, 1-2 wt % of a photoinitiator and 0.2-0.5 wt % of a chemical initiator forming a third mixture; and centrifuging, the container, for a set time period and at a set rotational speed.

2. The method of claim 1, wherein the mesogen is 1,4-Bis-[4-(6-acryloyloxyhexyloxy)benzoyloxy]-2methyl-benzene (RM82) and the reaction inhibitor is Butylated Hydroxytoluene (BHT).

3. The method of claim 1, wherein the joining molecule is 2,2-(ethylenedioxy)diethanethiol (EDDET) and the vinyl cross-linker is 1,3,5-triallyl-1,3,5-triazine-2,4,6(1H,3H,5H) trione (TATATO).

4. The method of claim 1, wherein the photo initiator photoinitiator is 2,2-dimethoxy-2-phenylacetophenone (I-651) and the chemical initiator is Dipropylamine (DPA).

5. The method of claim 1, wherein the set time period is 3 minutes, and the set rotational speed is 3000 revolutions per minute.

6. A resin used for manufacturing high actuation temperature LCE fibers made by the method of claim 1, said resin being configured to produce LCE fibers having thermal-actuation characteristics including an actuation temperature that is above a safe skin temperature.

7. A method of synthesizing a resin used for manufacturing low actuation temperature LCE fibers, the method comprising:

mixing, in a first container, 46 wt % of a mesogen, 15 wt % of a reactive mesogen, and 2 wt % of a reaction inhibitor, to form a first mixture;

melting, the first mixture in the first container, a heat applied to the first container being at a temperature of 80° C.;

mixing, in a second container, 28 wt % of a joining molecule and heating the container to 80° C.;

pouring, the first mixture in the first container, into the second container forming a second mixture;

mixing, in the second container, the second mixture, 1.4 wt % of a photoinitiator, and 6 wt % of a vinyl cross-linker;

mixing, into the second container 1 wt % of a catalyst; and centrifuging, the container, for a set time period and at a set rotational speed.

8. The method of claim 7, wherein the mesogen is 1,4-Bis-[4-(6-acryloyloxyhexyloxy)benzoyloxy]-2methyl-benzene (RM82), the reactive mesogen is Bis-[4-(3-acryloyloxypropyloxy)benzoyloxy]-2methylbenzene (RM-257) and the reaction inhibitor is Butylated Hydroxytoluene (BHT).

9. The method of claim 7, wherein the joining molecule is glycol di(3-mercaptopropionate) (GDMP).

10. The method of claim 7, wherein the photoinitiator is 2,2-dimethoxy-2-phenylacetophenone (I-651) and the vinyl cross-linker is 1,3,5-triallyl-1,3,5-triazine-2,4,6(1H,3H,5H)trione (TATATO).

11. The method of claim 7, wherein the catalyst is Triethylamine (TEA).

12. A resin used for manufacturing low actuation temperature LCE fibers made by the method of claim 7, said resin being configured to produce LCE fibers having thermal-actuation characteristics including an actuation temperature that is at skin temperature.

\* \* \* \* \*